United States Patent
Kuramoto et al.

(10) Patent No.: US 11,643,553 B2
(45) Date of Patent: May 9, 2023

(54) SILICONE RESIN COMPOSITION AND METHOD OF PRODUCING SAME

(71) Applicant: NICHIA CORPORATION, Anan (JP)

(72) Inventors: Masafumi Kuramoto, Tokushima (JP); Katsuyuki Tsunano, Tokushima (JP); Takuma Arikawa, Komatsushima (JP)

(73) Assignee: Nichia Corporation, Anan (JP)

( * ) Notice: Subject to any disclaimer, the term of this patent is extended or adjusted under 35 U.S.C. 154(b) by 337 days.

(21) Appl. No.: 16/832,210

(22) Filed: Mar. 27, 2020

(65) Prior Publication Data

US 2020/0308405 A1 Oct. 1, 2020

(30) Foreign Application Priority Data

Mar. 29, 2019 (JP) .............................. JP2019-067328

(51) Int. Cl.
*C08L 83/04* (2006.01)
*C08K 3/22* (2006.01)
*C08K 5/09* (2006.01)
*C08K 5/11* (2006.01)

(52) U.S. Cl.
CPC ............. *C08L 83/04* (2013.01); *C08K 3/22* (2013.01); *C08K 5/09* (2013.01); *C08K 5/11* (2013.01); *C08K 2003/221* (2013.01); *C08K 2003/2244* (2013.01); *C08K 2201/005* (2013.01)

(58) Field of Classification Search
CPC .... C08K 3/22; C08K 2003/2244; C08L 83/04
See application file for complete search history.

(56) References Cited

U.S. PATENT DOCUMENTS

| | | | | |
|---|---|---|---|---|
| 4,310,444 A | * | 1/1982 | Hamada | C08K 5/09 524/400 |
| 8,907,001 B2 | * | 12/2014 | Pottier | C08K 9/06 523/209 |
| 9,550,864 B2 | * | 1/2017 | Bloomfield | C08G 77/16 |
| 2006/0286390 A1 | | 12/2006 | Yaginuma et al. | |
| 2013/0099395 A1 | | 4/2013 | Ona et al. | |
| 2013/0211016 A1 | | 8/2013 | Otsuka et al. | |
| 2013/0271999 A1 | | 10/2013 | Shiobara et al. | |
| 2017/0210964 A1 | | 7/2017 | Ito et al. | |

FOREIGN PATENT DOCUMENTS

| | | | |
|---|---|---|---|
| EP | 2 554 585 A1 | 2/2013 | |
| JP | 51-41046 A | 4/1976 | |
| JP | 51041046 A * | 4/1976 | ............... C08K 5/05 |
| JP | 7-126531 A | 5/1995 | |
| JP | 2002-12768 A | 1/2002 | |
| JP | 2002-60610 A | 2/2002 | |
| JP | 2006-348410 A | 12/2006 | |
| JP | 2007-70603 A | 3/2007 | |
| JP | 2012-21117 A | 2/2012 | |
| JP | 2012-255070 A | 12/2012 | |
| JP | 2013-35890 A | 2/2013 | |
| JP | 2013-91705 A | 5/2013 | |
| JP | 2013-221077 A | 10/2013 | |
| JP | 2014-116420 A | 6/2014 | |
| JP | 2016-30774 A1 | 3/2016 | |
| JP | 2016-115729 A | 6/2016 | |
| JP | 2018-123200 A | 8/2018 | |

* cited by examiner

*Primary Examiner* — Vickey Nerangis
(74) *Attorney, Agent, or Firm* — Birch, Stewart, Kolasch & Birch, LLP

(57) ABSTRACT

A silicone resin composition includes a silicone resin and a ceria-zirconia solid solution, with the solid solution being contained in a range of 0.01 to 2 parts by mass relative to 100 parts by mass of the silicone resin.

13 Claims, No Drawings

SILICONE RESIN COMPOSITION AND METHOD OF PRODUCING SAME

CROSS-REFERENCE TO RELATED PATENT APPLICATION

The present application claims priority under 35 U.S.C. § 119 to Japanese Patent Application No. 2019-067328, filed Mar. 29, 2019. The contents of Japanese Patent Application No 2019-067328 are incorporated herein by reference in their entirety.

BACKGROUND OF THE INVENTION

1. Field of the Invention

The present disclosure relates to a silicone resin composition and a method of producing the silicone resin composition.

2. Discussion of the Background

Light emitting devices such as LEDs have been used for lighting, signals, backlights of liquid crystal display panels. In recent years, light emitting devices of small physical size, high optical output power, and high brightness, such as power LEDs, for use in headlamps of automobiles have been in demand.

SUMMARY OF THE INVENTION

A silicone resin composition according to the present disclosure includes a silicone resin and ceria-zirconia solid solution, in which the solid solution is contained in a range of 0.01 to 2 parts by weight with respect to 100 parts by weight of the silicone resin.

The cured resin product according to the present disclosure is configured to serve as a reflector of a light-emitting device and/or to cover a light-emitting element, obtained by curing the silicone composition.

A method of producing the silicone resin composition according to the present disclosure includes dispersing a ceria-zirconia solid solution in an organic solvent to obtain a dispersion, and mixing the dispersion with a silicone resin.

DETAILED DESCRIPTION OF EMBODIMENTS

The below mentioned embodiments are intended to illustrate exemplary light emitting devices for implementing the technical concept of the present invention, and are not intended to limit elements recited in the scope of claims to those described in the embodiments. A size, a material, and a shape of the constituent members, and a relative positioning therebetween exemplified in the embodiments are not intended to limit the scope of the present invention.

A silicone resin composition, a method of producing the silicone resin composition, and a cured silicone resin composition according to certain embodiments of the present disclosure will be described in detail below.

A silicone resin composition according to the present disclosure includes a silicone resin and ceria-zirconia solid solution, in which the solid solution is contained in a range of 0.01 to 2 parts by weight with respect to 100 parts by weight of the silicone resin.

The solid solution preferably has a particle size D50 in a range of 1 nm to 1 μm.

The silicone resin composition is preferably for use in forming a reflector of a light emitting device and/or in covering a light emitting element of a light emitting device.

The silicone resin compound preferably further contains a dispersant.

The dispersant is preferably a fatty acid having carbon atoms in a range of 6 to 24.

The fatty acid preferably has at least one branched aliphatic chain.

The silicone resin composition preferably further includes cerium silanolate.

The silicone resin composition preferably constitutes dimethyl silicone as a main component.

Certain embodiments of the present disclosure can provide a silicone resin composition with significant reduction in occurrence of cracks when cured. Further, certain embodiments of the present disclosure can provide a cured silicone resin composition for use as a reflector in a light emitting device and/or as a covering of one or more light emitting elements in a light emitting device. Further, certain embodiments of the present disclosure can provide a method of producing a silicone resin composition in which a ceria-zirconia solid solution (may be referred to a "CZ solid solution" in the present specification) of small particle size is favorably dispersed.

The cured silicone resin product according to certain embodiments of the present disclosure is for use as a reflector of a light emitting device and/or as a covering of a light emitting element of a light emitting device, obtained by curing the silicone resin composition.

The cured silicone resin product to provide for a reflector of a light emitting device further includes a light-reflecting member, and the silicone resin has a refractive index in a range of 1.35 to 1.5, and the light-reflecting member has a refractive index of at least 2.0.

A method of producing the silicone resin composition according to certain embodiments of the present disclosure includes dispersing a ceria-zirconia solid solution in an organic solvent to obtain a dispersion, and mixing the dispersion with a silicone resin.

The solid solution is preferably contained in a range of 0.01 to 2 parts by mass relative to 100 parts by mass of the silicone resin.

In the dispersing, a dispersant is preferably added in the organic solvent.

In the dispersing, a bead mill is applied.

In the mixing, after the dispersion is mixed with the silicone resin, the organic solvent is preferably removed.

Silicone Resin Composition

According to one embodiment, the silicone resin composition includes a silicone resin and ceria-zirconia solid solution, in which the solid solution is contained in a range of 0.01 to 2 parts by weight with respect to 100 parts by weight of the silicone resin.

Silicone Resin

Type(s) of silicone resin employed in the silicone resin composition can be appropriately selected from, for example, various curable silicone resins used in the fields of semiconductors, light emitting devices, and/or the like and that can be cured by heating or the like. Among those, an appropriate silicone resin employed to cover one or more light emitting elements can be preferably used. One type of silicone resin may be singly used, or two or more types of silicone resin may be used in combination.

Silicone resin having dimethyl silicone as its main component is preferably used due to its good light-resisting properties and good heat-resisting properties. In the present specification, the term "silicone resin having dimethyl silicone as its main component" refers to cases in which the silicone resin contained in the silicone resin composition is solely dimethyl silicone, or in which the mass content of dimethyl silicone contained in the silicone resin composition is greater than the respective mass contents of the other silicone resins, preferably the mass content of dimethyl silicone is greater than the total mass content of other silicone resins, in other words, the mass content of dimethyl silicone is greater than 50% of the total mass content of silicone resins contained in the silicone resin composition.

The silicone resin may be a two-component silicone resin. A two-component silicone resin includes separate components (A) and (B) that can be, for example, a component (A) of organopolysiloxane having at least two alkenyl groups in a single molecule and a component (B) of organohydrogenpolysiloxane having at least two hydrosilyl groups in a single molecule, and a catalyst (C) is contained in either one of or both the polysiloxanes: the organopolysiloxane (A) and the organohydrogenpolysiloxane (B). Mixing of organopolysiloxane (A) and organopolysiloxane (B) in the presence of the catalyst (C), followed by heating to a predetermined temperature causes curing of the two-component silicone resin.

The organopolysiloxane (A) employed in the present specification has at least two alkenyl groups in a single molecule. The molecular structure of the organopolysiloxane (A) can be straightly linear, branched, cyclic, or partially branched straightly linear shape, or a combination of those. The bonding position of the at least two alkenyl groups are not determining factors and can be located, for example, on molecular terminals and/or on side chains. Examples of alkenyl groups include vinyl, allyl, propenyl, and butenyl, and vinyl group is preferable because of ease of production.

Examples of the groups other than alkenyl groups that may be contained in the organopolysiloxane (A) include a univalent hydrocarbon group other than an alkenyl group. More specific examples thereof include an alkyl group such as methyl, ethyl, or propyl; an allyl group such as phenyl or tolyl; an aralkyl group such as benzyl or phenethyl; a substituted alkyl group such as chloromethyl or 3,3,3-trifluoropropyl.

As the organopolysiloxane (A), a dimethylorganopolysiloxane in which monovalent hydrocarbon groups other than alkenyl groups are mainly methyl groups is preferable particularly in view of heat-resistance and light-resistance.

The organohydrogenpolysiloxane (B) employed in the present specification has at least two hydrosilyl groups in a single molecule. The molecular structure of the organopolysiloxane (A) can be straightly linear, branched, cyclic, or partially branched straightly linear shape, or a combination of those.

The bonding position of the at least two hydrosilyl groups are not determining factors and can be located, for example, on molecular terminals and/or on side chains. Examples of organopolysiloxane include an organopolysiloxane with a hydrosilyl group at both terminal ends, an organopolysiloxane terminated at both ends by trimethylsilyl groups, or a methylhydrosiloxane-dimethylsiloxane copolymer terminated at both ends by trimethylsilyl groups.

As the organohydrogenpolysiloxane (B), a methylhydrosiloxane-dimethylsiloxane copolymer is preferable particularly in view of heat-resistance and light-resistance.

The components (A) and (B) are desirably used such that the number of hydrosilyl groups in the component (B) is 0.75 to 2.0 per alkenyl group in the component (A).

As the catalyst (C), any known catalyst used for hydrosilylation of organopolysiloxane can be generally used. More specific examples thereof include platinum-based catalysts, palladium-based catalysts, and rhodium-based catalysts. Of those, a platinum-based catalyst is preferable in view of curing. Examples of platinum-based catalysts include chloroplatinic acid, alcohol-modified chloroplatinic acid, and a platinum complex having a chelate structure. For the catalyst (C), one of the above may be used alone or two or more of the above may be used in combination.

The catalyst (C) can be contained, for example when a platinum-based catalyst is used, in a range of 0.0001 to 1 parts by mass, preferably in a range of 0.001 to 0.1 parts by mass, in terms of platinum, with respect to 100 parts by mass of total solid components of the components (A) and (B).

For the silicone resin described above, a commercially available silicone resin may be used, general examples thereof include OE-6630A/B, OE-6336A/B, OE-6351A/B, OE-6250A/B, EG-6301A/B, JCR-6140A/B, JCR-6125A/B, JCR-6101UP, OE-6450A/B, OE-6520-A/B, OE-6550A/B, OE-6631A/B, OE-6636A/B, and OE-6635A/B, which are manufactured by Dow Corning Toray Co., Ltd.

In the examples shown above, the solution A and/or B is a polysiloxane having an alkenyl group or hydrosilyl group, and a platinum-based hydrosilylation catalyst is added with a sufficient amount for hydrosilylation polymerization and curing.

In terms of durability and/or light-transmissive property, the silicone resin preferably has a refractive index in a range of 1.35 to 1.5, more preferably in a range of 1.40 to 1.45. In the present specification, "refractive index of silicone resin" refers to a refractive index of a cured silicone resin product.

The silicone resin can be contained in the silicone resin composition at a content of, for example, 20 mass % or greater, preferably 22 mass % or greater, and more preferably 25 mass % or greater, which is also 99.9 mass % or less, preferably 98 mass % or less, particularly preferably 95 mass % or less.

Ceria-Zirconia Solid Solution (CZ Solid Solution)

Ceria-zirconia (CZ) solid solution is sometimes expressed as $CeO_2$—$ZrO_2$ solid solution. The solid solution expressed as "$CeO_2$—$ZrO_2$ solid solution" is also included in the present disclosure. For the CZ solid solution, any appropriate CZ solid solution known in a wide range can be used. For example, a CZ solid solution used as a catalyst for intoxication of automobile exhaust gas can be used.

CZ solid solutions are known to store and release oxygen in a high temperature environment (for example at 500° C. or greater) such as in automobile exhaust gases. Meanwhile, the ability of CZ catalysts to store and release oxygen at a lower temperature (for example at 400° C. or less, preferably at 350° C. or less), and further, in a hermetic condition (for example a CZ catalyst in a sealing resin member) have not been known.

The content ratio between Ce and Zr in a CZ solid solution can be, for example, in a range of 5:95 to 95:5, 10:9 to 901:10, (25 to 75):(75 to 25), 35:65 to 65:3.5, 45:55 to 55:45, 5:95 to 30:7, 10:90 to 30:70, or 15:85 to 30:70, and preferably in a range of 20:80 to 8:92 in terms of moles (Ce:Zr). When the molar ratio of Ce:Zr is in the range shown above, the ability of storing and releasing oxygen can be further improved. For the CZ solid solution, one type of CZ solid solution may be singly used, or two or more types of CZ solid solutions may be used in combination.

The content of the CZ solid solution in the silicone resin composition can be, for example, 0.01 parts by mass or greater, preferably 0.05 parts by mass or greater, more preferably 0.3 parts by mass or greater, and for example, 2 parts by mass or less, preferably 1.5 parts by mass or less, more preferably 1 parts by mass or less, relative to 100 parts by mass of the silicone resin. When the content of the CZ solid solution is in the range shown above, it is more advantageous for maintaining the degree of light-transmissive property within a predetermined range.

The CZ solid solution in the silicone resin composition has particle size D50 (median diameter), which may be referred to as "particle size D50 of CZ-solid solution" in the present specification, for example in a range of 1 nm to 1 μm, preferably in a range of 5 nm to 300 nm, more preferably in a range of 10 nm to 150 nm. When the particle size D50 of CZ-solid solution is in a range shown above, sedimentation of the CZ solid solution in the silicone resin composition can be further impaired, such that localized distribution of the CZ solid solution in a lower portion of the cured product can be reduced. This can facilitate the presence of the CZ solid solution in a portion of the cured product closer to the environmental air (in an upper portion, a surface, and the like), which can facilitate capture of oxygen molecules in the environmental air entering the cured product. The particle size D50 in the present specification was measured using a dynamic light scattering method (DLS method).

In the CZ solid solution of small particle size (for example nano particles in the CZ solid solution), primary particles tend to aggregate. Accordingly, the CZ solid solution is often aggregated when produced or acquired. If the aggregated particles (secondary particles) of the CZ solid solution exhibit particle size D50 greater than the range shown above, the particle size of the secondary particles is preferably adjusted within the range by using appropriate dispersing method, preferably using a ball mill to be described later in the specification, before producing the silicone resin composition.

The particle size of the primary particles of the CZ solid solution (in the present specification, indicated as the particle size D50 of the primary particles) can be, for example, in a range of 1 nm to 30 nm, preferably in a range of 5 nm to 15 nm.

In the present disclosure, the CZ solid solution may present in the silicone resin composition in the state of primary particles or in the state of aggregated secondary particles (aggregated secondary particles). In either state, those particles are preferably dispersed in the CZ solid solution, without precipitating. For such reason, the particle size D50 of those particles can be in a range of 1 nm to 30 nm, preferably in a range of 5 nm to 15 nm.

The CZ solid solution may be surface treated with a modified silicone oil or the like. The state of dispersion of the CZ solid solution in the silicone resin can be improved by such a surface treatment. Examples of the modified silicone oil include amino-modified silicone oil, epoxy-modified silicone oil, carboxy-modified silicone oil, carbinol-modified silicone oil, carboxylic anhydride modified silicone oil, methacrylic-modified silicone oil, mercapto-modified silicone oil, and phenol-modified silicone oil, and such modifications can be introduced on side chain(s), an end, both ends, or two or more of those locations of a polysiloxane structure. The modified silicone oil is preferably epoxy-modified silicone oil, more preferably modified silicone oil having alicyclic epoxy-modified side chain(s). For the catalyst (C), one of the above may be used alone or two or more of the above may be used in combination.

Dispersant

The silicone resin composition may include a dispersant in addition to the silicone resin and the CZ solid solution described above. For the dispersant, one type of dispersant may be singly used, or two or more types of dispersant may be used in combination. The dispersant is configured to improve dispersion of the CZ solid solution. When the dispersant is employed to obtain CZ solid solution particles of desired particle size from primary particles of the CZ solid solution, the dispersant may be added with the CZ solid solution to the silicone resin, such that generally a small amount of the dispersant may be contained in the silicone resin composition.

For the dispersant, various types of dispersants used to disperse filler material in resin can be employed. Examples of the dispersant include fatty acids and polymeric surfactants. For the fatty acid, for example, a fatty acid having six or more carbon atoms with linear or branched aliphatic chain(s) is preferable. The fatty acid can be either a saturated fatty acid or an unsaturated fatty acid. For the fatty acid, one type of fatty acid may be singly used, or two or more types of fatty acids may be used in combination.

The greater the number of carbon atoms in the fatty acid molecule, greater suppression in aggregation of the CZ solid solution particles, which allows for obtaining the CZ solid solution having a smaller particle size, and therefore preferable. The number of carbon atoms in the fatty acid molecule is preferably in a range of 6 to 24, more preferably in a range of 7 to 16, particularly preferable in a range of 8 to 12.

The fatty acids having a branched shape are more preferable than the fatty acid having a linear shape, because particle size of the CZ solid solution in the silicone resin can be smaller with a fatty acid having a branched shape than with a fatty acid having a linear shape.

The particle size of the CZ solid solution in the silicone resin can be made smaller by using a saturated fatty acid than by using an unsaturated fatty acid, such that the use of saturated acid is more preferable.

Examples of the fatty acid having a linear shape include heptanoic acid, octanoic acid, nonanoic acid, decanoic acid, dodecanoic acid, tetradecanoic acid, pentadecanoic acid, hexadecenoic acid, heptadecanoic acid, octadecanoic acid, eicosanoic acid, docosanoic acid, myristoleic acid, palmitoleic acid, oleic acid, elaidic acid, vaccenic acid, gadoleic acid, linoleic acid, linolenic acid, eicosenoic acid, eicosadienoic acid, eicosatrienoic acid, eicosatetraenoic acid, and erucic acid. Examples of the fatty acid having a branched shape include 2-ethylhexanoic acid and neodecanoic acid.

The content of the dispersant in the silicone resin composition can be, for example, 5 parts by mass or greater, preferably 10 parts by mass or greater, more preferably 15 parts by mass or greater, particularly preferably 20 parts by mass or greater, and for example, 100 parts by mass or less, preferably 80 parts by mass or less, more preferably 50 parts by mass or less, particularly preferably 30 parts by mass or less, with respect to 100 parts by weight of the CZ solid solution. When the content of the dispersant is within the range shown above, aggregation of the CZ solid solution can be reduced and the particle size of the particles in the CZ solid solution can be made smaller.

Cerium Silanolate

The silicone resin composition may contain cerium silanolate in addition to the silicone resin and the CZ solid solution described above. Containing cerium silanolate can facilitate capturing of oxygen molecules in the environmental air entering the cured silicone product, which can reduce generation of cracks. For the cerium silanolate, one type of cerium silanolate may be singly used, or two or more types of cerium silanolate may be used in combination.

In the present specification, the cerium silanolate is a silicon-containing compound having at least one unit in which a cerium atom is bonded to a silicone atom via an oxygen atom, and the silicon-containing compound is preferably an organosiloxane oligomer. Other than the cerium atom, an organic group preferably a monovalent hydrocarbon group, more preferably an alkyl group having 1 to 10 carbon atoms, may be bonded to a silicone atom. Examples of such cerium silanolates include a reaction product of a cerium salt of an organic carboxylic acid and an alkali metal silanolate having an organosiloxane unit as illustrated in JPS61-24377B2, a reaction product of cerium chloride and an alkali metal silanolate having an organosiloxane unit as illustrated in JPS53-980B2, and a composition obtained by blending a titanium salt of an organic carboxylic acid or an alkoxy compound of titnium with a reaction product of a cerium salt of an organic carboxylic acid and an alkali metal silanolate as illustrated in JPS53-12541B2.

The content of cerium silanolate in the silicone resin composition can be, for example, 0.01 parts by mass or greater, preferably 0.05 parts by mass or greater, more preferably 0.1 parts by mass or greater, particularly preferably 0.3 parts by mass or greater, and for example, 1.0 parts by mass or less, preferably 0.8 parts by mass or less, more preferably 0.5 parts by mass or less. When the content of the cerium silanolate is within the range shown above, yellow coloring of the silicone resin composition due to cerium silanolate can be reduced, which can further facilitate capturing of oxygen molecules.

Light-Reflecting Member

When the silicone resin composition is for use in forming a reflector of a light emitting device, the composition preferably contains a light-reflecting member such that light from the light emitting element can be reflected more efficiently at the reflector which allows adjusting the direction of the emission. For the light-reflecting member, one type of light-reflecting member may be singly used, or two or more types of light-reflecting members may be used in combination.

In order to reflect greater amount of light from the light emitting element, the light-reflecting member preferably has a refractive index greater than the refractive index of the silicone resin, more specifically, a refractive index of preferably 2.0 or greater, more preferably in a range of 2.5 to 2.8. The light-reflecting member can be, for example, microparticles of titanium oxide, silicon oxide, zirconium oxide, yttrium oxide, yttria-stabilized zirconia, potassium titanate, alumina, aluminum nitride, boron nitride, and mullite, among those, titanium oxide ($TiO_2$) having higher refractive index is preferable for its high reflecting property.

The content of the light-reflecting member in the silicone resin composition can be, for example, 30 parts by mass or greater, preferably 45 parts by mass or greater, more preferably 50 parts by mass or greater, and for example, 100 parts by mass or less, preferably 90 parts by mass or less, more preferably 80 parts by mass or less, particularly preferably 70 parts by mass or less, relative to 100 parts by mass of the silicone resin.

Other Materials

The silicone resin composition can also include, according to application or a purpose, a coloring agent, a light-diffusing agent, various filler materials, a wavelength converting member (for example, a yellow fluorescent material such as YAG ($Y_3Al_5O_{12}$:Ce) and silicate, a red fluorescent material such as CASN ($CaAlSiN_3$:Eu), SCASN ((Sr, Ca)$AlSiN_3$:Eu), and KSF ($K_2SiF_6$:Mn), a plasticizer, a viscosity modifier, a flexibility imparting agent, a light stabilizer, a reaction inhibitor, an adhesion promoter, with an appropriate amount in so far as the effects of the present disclosure can be obtained.

The silicone resin composition can be used in forming sealing layers of various types of semiconductors, in forming a reflector used in a light emitting device, in enclosing a light emitting element of a light emitting device, in forming a color-converting plate containing a fluorescent material, or the like, in particular, advantageous in forming a cured product that is required to have optical transparency and durability.

Method of Producing Silicone Resin Composition

According to one embodiment, a method of producing a silicone resin composition includes dispersing a ceria-zirconia solid solution in an organic solvent to obtain a dispersion, and mixing the dispersion with a silicone resin.

Dispersing

In the step of dispersing, a CZ solid solution is dispersed in an organic solvent to obtain a dispersion.

The details of the CZ solid solution have been described above in 1. Silicone Resin Composition.

Any appropriate organic solvent that allows the CZ solid solution dispersed therein can be used. Among such organic solvents, an organic solvent compatible with the silicone resin is preferable because the dispersion as it is can be included in the silicone resin. Examples of the organic solvents include ether solvents such as ether, tetrahydrofuran (THF), dioxane, and dimethoxymethane; aromatic hydrocarbon solvents such as toluene, benzene, and xylenes; halogenated hydrocarbon-based solvents such as dichloromethane, chloroform, dichloroethane, and tetrachloromethane; aprotic solvents such as acetone, dimethyl sulfoxide, N—N dimethylformamide (DMF), and acetonitrile; and pyridine. Two or more of those organic solvents may be used as a mixture at an appropriate ratio. In view of dispersibility of the CZ solid solution and compatibility with the silicone resin, preferable organic solvents are toluene and xylene. The usage amount of the organic solvent can be appropriately determined based on the amount of the CZ solid solution.

In one embodiment, in the step of dispersing, the CZ solid solution and a dispersant are dispersed in an organic solvent to obtain a dispersion. The dispersibility of the CZ solid solution can be further enhanced with an optional addition of a dispersant in the organic solvent. The details of the dispersant have been described above in 1. Silicone Resin Composition.

In the step of dispersing, the CZ solid solution particles and a dispersant as needed are added to the organic solvent, and stirred to disperse the CZ solid solution. The stirring temperature can be generally in a range of 3 to 40° C., preferably in a range of 5 to 30° C. with an appropriate stirring time determined according to the state of dispersion. The stirring can be performed by using a rotating shear type stirrer, a colloid mill, a high pressure jetting stirring device, an ultrasonic wave disperser, a container driving milling device (rotation mill, vibration mill, planetary mill, etc.), or a medium agitation mill (an attritor, a bead mill, etc.). Among those, a medium agitation mill is preferably used, and a bead mill is more preferably used.

In the step of dispersing, in addition to the CZ solid solution particles, an organic solvent, and a dispersant, another material such as a light-transmissive filler material may be added in the organic solvent.

Mixing

In the step of mixing, the dispersion is mixed with a silicone resin to obtain a silicone resin composition. The dispersion obtained in the step of dispersing is an organic solvent with the CZ solid solution dispersed therein. The dispersion is mixed with the silicone resin to obtain the silicone resin composition that contains the CZ solid solution.

The mixing ratio of the dispersion to the silicone resin can be appropriately determined to obtain a predetermined amount of the CZ solid solution in the silicone resin, for example, a ratio that can provide the amount of the CZ solid solution described above in 1. Silicone Resin Composition. Further, when a two-component silicone resin is employed, the dispersion can be mixed in either a component A or a component B, or in both the component A and the component B, but in view of good storage stability, the dispersion is preferably mixed with the component B.

In the step of mixing, after mixing the dispersion with the silicone resin, the organic solvent in the dispersion is preferably removed, in terms of safety in handling. The organic solvent can be removed by using a known technique, for example, feeding the mixture in an evaporator and reducing the pressure in the evaporator.

In the step of mixing, the dispersion is mixed with the silicone resin at a temperature generally in a range of 20 to 60° C., preferably in a range of 30 to 50° C., with a time of mixing appropriately determined according to the degree of mixing.

Using the method of producing a silicone resin composition described above, a silicone resin composition dispersed with a CZ solid solution of small particle size can be obtained. In a cured product of the silicone resin composition, occurrence of cracks can be reduced.

Cured Silicone Resin Product

In one embodiment, the cured silicone resin product is a cured product of the silicone resin composition described above, formed to provide for a reflector of a light emitting device and/or for covering a light emitting element (of a light emitting device).

The cured silicone resin product can be obtained by curing the silicone resin composition described above.

Curing of the silicone resin composition can be performed according to the curing conditions of the silicone resin contained in the silicone resin composition. For example, the silicone resin composition is brought to a curing temperature of the silicone resin, by heating when needed, to cure the silicone resin composition.

The cured silicone resin product has high transparency with a reduced occurrence of cracks, and thus is suitably applied for the reflector of a light emitting device and for covering of a light emitting element of a light emitting device.

When the cured silicone resin product is provided for a reflector, the cured silicone resin product preferably include a light-reflecting member, and the light-reflecting member preferably has a refractive index of at least 2.0 and the silicone resin that constituting the cured product preferably has a refractive index in a range of 1.35 to 1.5, which allows the reflector to reflect a larger amount of light from the light emitting element.

Other details of the cured silicone resin product can correspond to those described above in 1. Silicone Resin Composition.

EXAMPLES

Next, the present disclosure will be more specifically described with reference to examples, which however are not intended to limit the present disclosure. The details of the materials, devices, etc., used in the examples are shown below.

CZ solid solution 1: primary particle size (D50) 5 nm to 10 nm

CZ solid solution 2: CZ solid solution 1 surface treated with KF-102 (a modified silicone oil containing an alicyclic epoxy introduced on a side chain)

CZ solid solution 3: primary particle size (D50) 500 nm zirconia beads: 50 μm diameter bead mill: HFM02 (Ashizawa Finetech Ltd.)

silicone resin: OE-6351 (Dow Toray Co., Ltd.), dimethyl silicone resin, two component type, refractive index 1.41, curing conditions 150° C. for three hours, density (25° C.) 1.02 g/cm$^3$ Mixing machine: ARV-310LED (THINKY CORPORATION), rotation-revolution mixer

EXAMPLES AND EXPERIMENTAL EXAMPLES

Preparation of CZ Solid Solution in Toluene-based Dispersion

To prepare each slurry, 5.00 g of CZ solid nanoparticles, 1.25 g of one of the dispersants shown in Table 1, and 433.00 g of zirconia beads were mixed with toluene. Each slurry was charged in a bead mill and stirred (4456 rpm, 90 min) to obtain a toluene-based dispersion (solid content concentration of CZ solid solution of 4.66 mass %). The particle size D50 of CZ solid solution in the toluene-based dispersions are shown in Table 1. The particle size D50 was determined as shown below. In Table 1, the addition amounts of the dispersant were shown by the ratio (mass %) to the amount of the CZ solid solution.

Particle Size D50 of CZ Solid Solution in Toluene-Based Dispersion

The particle sizes D50 were measured by using a distribution and molecular weight measuring system (ELSZ-2000) manufactured by Otsuka Electronics Co., Ltd.

TABLE 1

| Toluene-based dispersion | CZ solid solution | | | Dispersant | | |
|---|---|---|---|---|---|---|
| | Type | Particle Size of Primary Particles (nm) | Surface Treatment | Type | Amount Added (mass %) | D50 (nm) |
| 1 | 1 | 5-10 | none | heptanoic acid | 50 | 780 |
| 2 | 1 | 5-10 | none | octanoic acid | 50 | 571 |
| 3 | 1 | 5-10 | none | nonanoic acid | 50 | 640 |
| 4 | 1 | 5-10 | none | decanoic acid | 50 | 351 |
| 5 | 1 | 5-10 | none | 2-ethylhexanoic acid | 25 | 188 |
| 6 | 1 | 5-10 | none | neodecanoic acid | 25 | 185 |
| 7 | 2 | 5-10 | treated | neodecanoic acid | 25 | 105 |

When linear fatty acids were used for the dispersants (dispersions 1 to 4), the higher number of carbon atoms in aliphatic chains, the smaller particle size D50 of the CZ solid solution in the silicone resin, higher degrees of dispersion were obtained.

When branched fatty acids (dispersions 5 to 7) were used, smaller particle sizes D50 of the CZ solid solution in the silicone resin were obtained compared to those with the linear fatty acids (dispersions 1 to 4), higher degrees of dispersion were obtained.

Surface treatment of the CZ solid solution gave smaller particle sizes D50 of the CZ solid solution in the silicone resin were obtained compared to the CZ solid solutions without being subjected to the surface treatment, higher degrees of dispersion were obtained.

Those results indicate that nanoparticles of the CZ solid solution have a low dispersion stability and easily aggregated, however, a fatty acid, in particular a fatty acid having greater number of carbon atoms and/or having branched aliphatic chains can suitably disperse the CZ solid solution nanoparticles and reduce the aggregation, thus can reduce sedimentation of aggregated particles of the CZ solid solution.

260° C. Cracking Resistance Test on Cured Silicone Resin Product

Some of the cured silicone resin products obtained as above were charged in a small high temperature chamber (STH-120, manufactured by ESPEC Corp) that was set to 250° C. to measure time until a crack occurs. The cured silicone resin products were taken out of the oven at each time period indicated in Table 2 to visually observe presence or absence of a crack. The test on the cured product was terminated when the occurrence of a crack was observed, and the cured products with no cracks were returned in the oven and the test was continued. At 843-hour test time period, the test was terminated.

The same test was also performed on cured products 1 to 3, in which the cured product 1 was prepared in the same manner as the silicone resin compound described above, except that the CD solid solution was not used, the cured product 2 was prepared in the same manner as the silicone resin compound described above, except that the dispersant was not used and the CZ solid solution 3 (particle size of primary particles 500 nm) was used and the dispersant was not used for the cured product 2, and the cured product 3 was prepared in the same manner as the silicone resin compound described above. The results are shown in Table 2.

TABLE 2

| | CZ Solid Solution | | | | Presence or Absence of Crack | | | | | | | | | |
|---|---|---|---|---|---|---|---|---|---|---|---|---|---|---|
| | Particle Size(nm) | | | | Presence (o):Absence (x) | | | | | | | | | |
| Cured Product | Primary Particles | Particles in Dispersion | Surface Treatment | Dispersant | Time Period | | | | | | | | | |
| | | | | | 171 | 315 | 538 | 387 | 411 | 749 | 770 | 795 | 819 | 843 |
| 1 | | none | | none | x | x | x | x | x | x | x | x | x | x |
| 2 | 500 | — (unknown) | | none | x | x | x | x | x | x | x | x | x | x |
| 3 | 5-10 | — (unknown) | none | none | o | o | o | x | x | x | x | x | x | x |
| 4 | 5-10 | 188 | none | 2-ethylhexanoic acid | o | o | o | o | o | o | x | x | x | x |
| 5 | 5-10 | 185 | none | neodecanoic acid | o | o | o | o | o | o | o | o | o | o |
| 6 | 5-30 | 105 | treated | neodecanoic acid | o | o | o | o | o | o | o | o | o | o |

Preparation of Silicone Resin Composition 32.18 g of toluene-based dispersion was charged in the component B (15.03 g) of the silicone resin and stirred (100 rpm, 20 min.) in the room temperature while evaporating toluene by reducing the pressure to 30 mbar by using an evaporator. Subsequently, the temperature was raised to 50° C. and further stirred (100 rpm, 2 hours) to obtain a master batch of dimethyl silicone (solid content concentration of CZ solid solution of 8.59 mass %).

The component A (5.00 g) and the component B (4.68 g) of the silicone resin and the obtained master batch (0.35 g) were charged in a mixing machine and stirring and defoaming were performed at 2.6 kPa, 1200 rpm, for 3 minutes to obtain a silicone resin composition.

Preparation of Cured Silicone Resin Product

Using a syringe, the obtained composition of 2 ml was dripped in a 23 ml aluminum cup. The aluminum cup is the placed in a vacuum oven, and defoaming was performed at less than 0.1 MPa for 10 minutes. Then, the aluminum cup was taken out from the vacuum oven and placed in a small oven. The temperature in the oven was raised from the room temperature to 150° C. in one hour, and held at 150° C. for 4 hours to obtain a cured silicone resin product in which the CZ solid solution particles were dispersed at a rate of 0.3 parts by mass to 100 parts by mass of the silicone resin.

Composition of the cured product 1 and the cured products 2 to 6 indicates that the inclusion of the CZ solid solution can reduce occurrence of cracks in the cured resin products. The cured products 2 to 6 exhibited that occurrence of a crack took a considerably long time when the particle size D50 of the CZ solid solution in the silicone resin (in other words, particle size in dispersion) of about 200 nm or less, particularly about 186 nm or less, thus indicating high tolerance to cracking.

From those results, the inclusion of the CZ solid solution, in particular the CZ solid solution having a small particle size D50 in the silicone resin composition is found effective in reducing occurrence of cracks in the cured resin composition.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:
1. A silicone resin composition comprising:
   a silicone resin having a refractive index in a range of 1.35 to 1.5,
   a ceria-zirconia solid solution, wherein the ceria-zirconia solid solution is contained in a range of 0.01 to 2 parts by mass relative to 100 parts by mass of the silicone resin and in the form of particles having a particle size D50 in a range of 1 nm to 30 nm, a dispersant comprising a fatty acid having 6 to 24 carbon atoms, wherein the dispersant is contained in a range of 5 to 100 parts by mass relative to 100 parts by weight of the ceria-zirconia solid solution, and a light-reflecting substance that is contained in a range of 30 to 100 parts by mass relative to 100 parts by mass of the silicone resin and has a refractive index of 2.5 to 2.8.

2. The silicone resin composition according to claim 1, wherein the fatty acid has at least one branched aliphatic chain.

3. The silicone resin composition according to claim 1, further comprising cerium silanolate.

4. The silicone resin composition according to claim 1, wherein the silicone resin comprises dimethyl silicone as a main component.

5. The silicone resin composition according to claim 1, wherein the ceria-zirconia solid solution is treated with a modified silicone oil.

6. A method of producing the silicone resin composition according to claim 1 comprising:
dispersing the ceria-zirconia solid solution in an organic solvent to obtain a dispersion; and
mixing the dispersion with the silicone resin.

7. The method of producing the silicone resin composition according to claim 6, wherein the solid solution is contained in a range of 0.01 to 2 parts by mass relative to 100 parts by mass of the silicone resin.

8. The method of producing the silicone resin composition according to claim 6, wherein in the dispersing, a dispersant is added to the organic solvent.

9. The method of producing the silicone resin composition according to claim 6, wherein in the dispersing, a bead mill is applied.

10. The method of producing the silicone resin composition according to claim 6, wherein in the mixing, after the dispersion is mixed with the silicone resin, the organic solvent is removed.

11. A light emitting device having a light emitting element and a reflector, wherein the reflector or a covering of the light emitting element is formed from the silicone resin composition according to claim 1.

12. A light emitting device having a light emitting element and a reflector, wherein the reflector or a covering of the light emitting element is formed from a cured silicone resin product of the silicone resin composition according to claim 1.

13. The light emitting device according to claim 12, which further comprises a light-reflecting substance, wherein the cured silicone resin product for the reflector of the light emitting device has a refractive index in a range of 1.35 to 1.5, and the light-reflecting substance has a refractive index of at least 2.0.

* * * * *